No. 813,300. PATENTED FEB. 20, 1906.
J. W. HYATT.
DISINTEGRATING MACHINE.
APPLICATION FILED MAY 3, 1905.
3 SHEETS—SHEET 1.
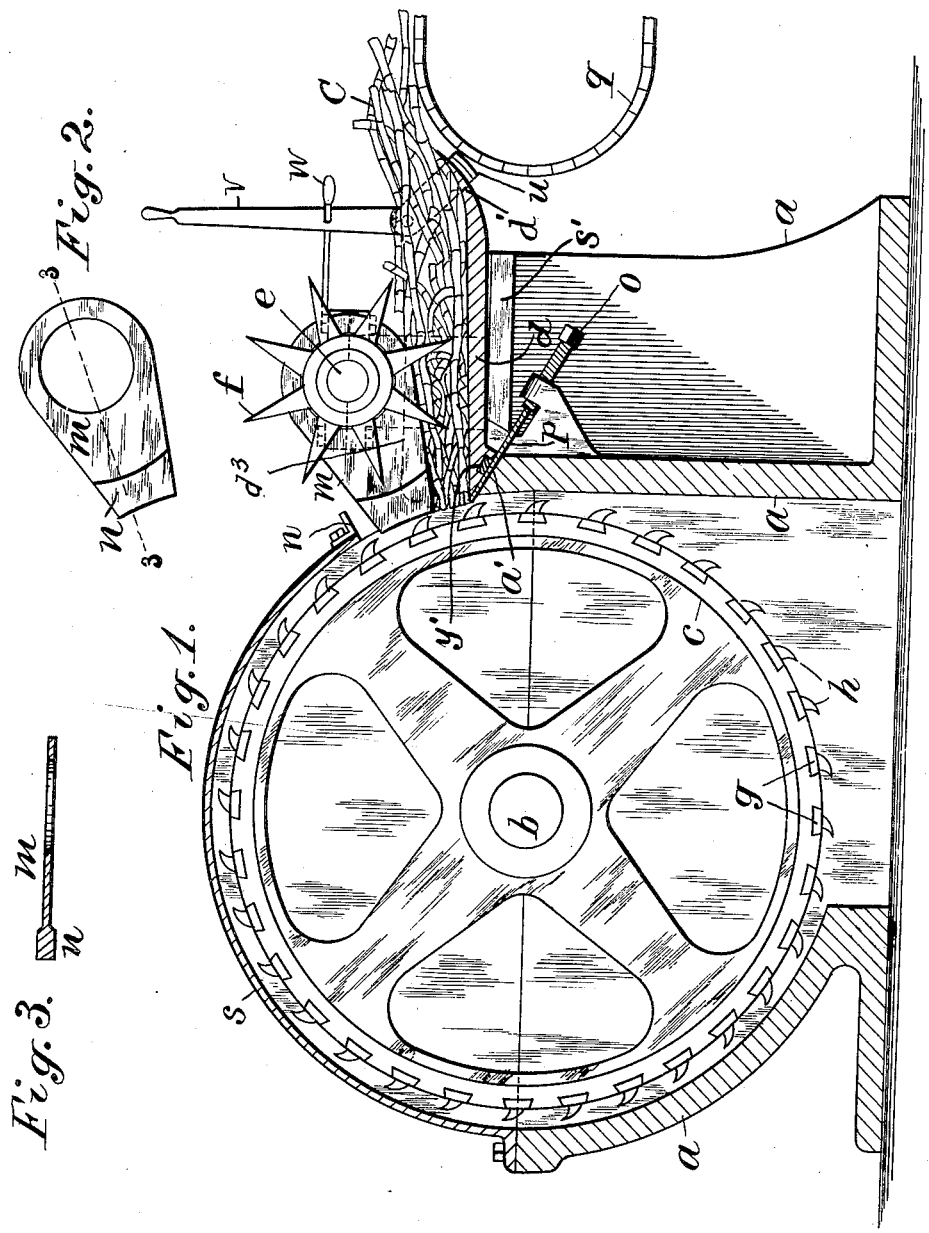
Attest:
L. Lee.
Arthur F. Heaton.
Inventor.
John W. Hyatt, per
Thomas S. Crane, atty.

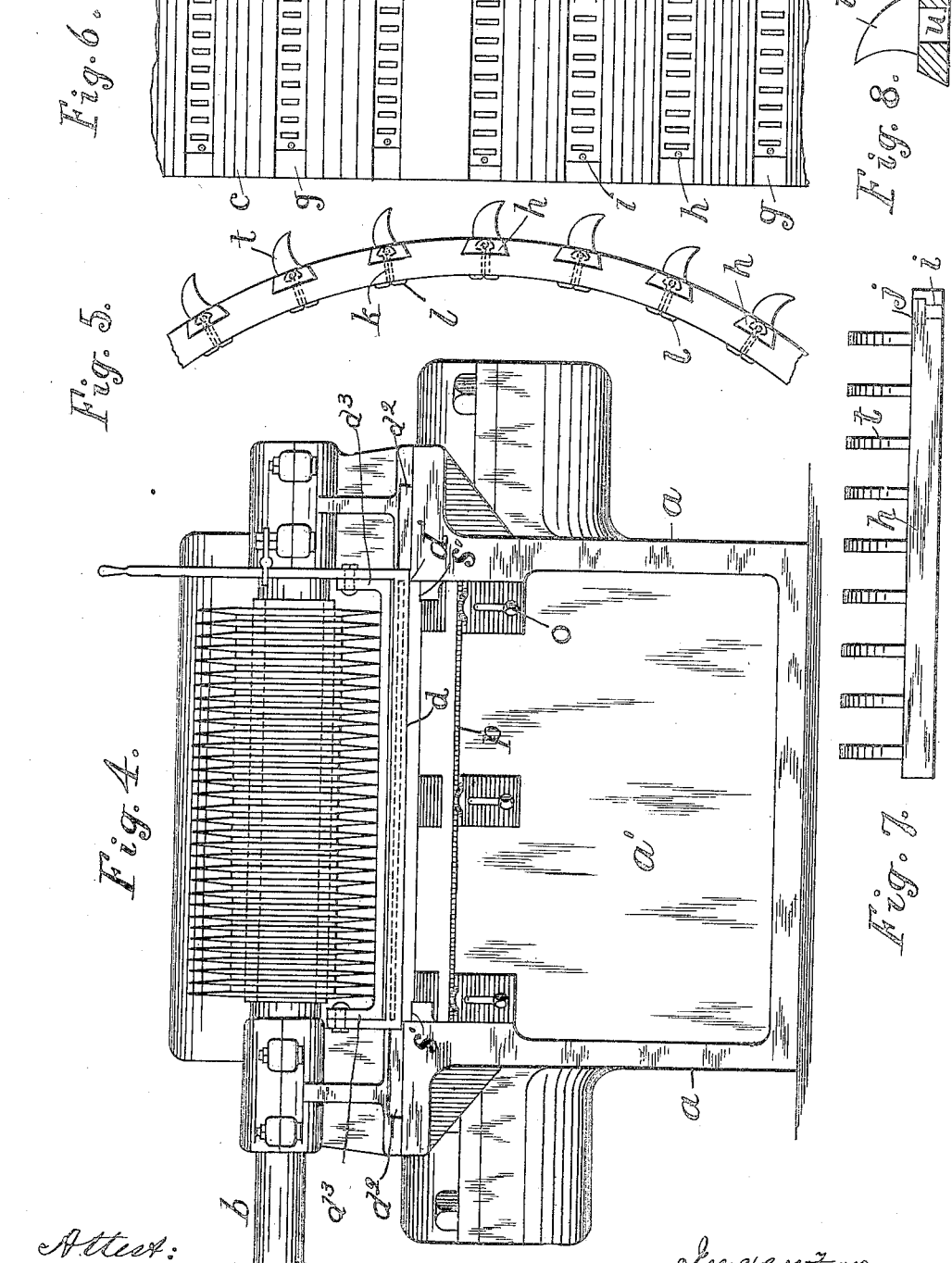

No. 813,300. PATENTED FEB. 20, 1906.
J. W. HYATT.
DISINTEGRATING MACHINE.
APPLICATION FILED MAY 3, 1905.
3 SHEETS—SHEET 3.
Fig. 9.
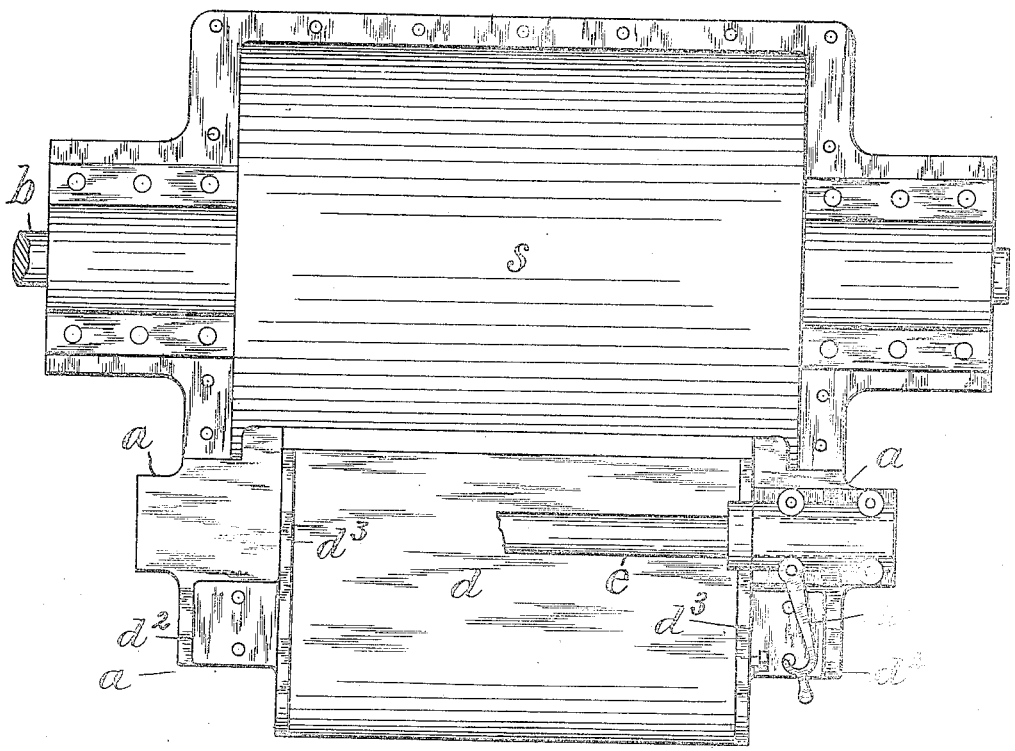
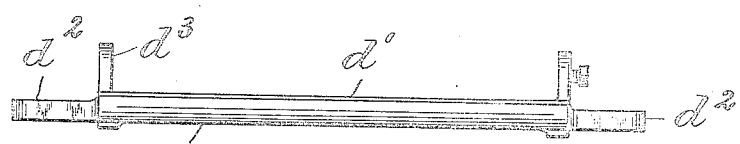
Fig. 10.
Attest:
L. Lee.
Arthur F. Watson.
Inventor.
John W. Hyatt, Jr.
Thomas S. Crane, Atty.

UNITED STATES PATENT OFFICE.

JOHN W. HYATT, OF NEWARK, NEW JERSEY, ASSIGNOR TO FRANK S. WARMOTH, OF LAWRENCE, LOUISIANA.

DISINTEGRATING-MACHINE.

No. 813,300.  Specification of Letters Patent.  Patented Feb. 20, 1906.

Application filed May 3, 1905. Serial No. 258,701.

*To all whom it may concern:*

Be it known that I, JOHN W. HYATT, a citizen of the United States, residing at 141 Commerce street, Newark, county of Essex, State of New Jersey, have invented certain new and useful Improvements in Disintegrating-Machines, fully described and represented in the following specification and the accompanying drawings, forming a part of the same.

The present invention relates to that class of disintegrating-machines which is designed, primarily, to reduce sugar-cane, beets, and other vegetables for treatment by the diffusion process to extract their sugar.

In machines having a drum covered with cutter-teeth for reducing sugar-cane it has been found difficult to support the cane close to the revolving teeth, as the teeth are constantly wearing away, as well as the edge of the feeding-table, thus producing a space in which the canes are insufficiently supported. This change in the relations of the teeth and the feeding-table increases the natural tendency of the teeth to drag downward without disintegration the stubs and ends of the canes which advance to the cutters when each cane is nearly consumed. Another difficulty in the practical use of such machines is the renewal or replacement of the teeth when they are accidentally injured by contact with a stone, spike, or steel tool which may be accidentally fed into the machine with a cane.

The invention furnishes an adjustable means for supporting the material close to the path of the teeth, and this is effected by beveling the forward edge of the feeding-table upon its under side and fitting a plate to such bevel to project at the front of the table where the material is supported. The plate is adjustable, so that it can be set as close as possible to the path of the moving teeth. It also provides means for grasping the material in such a manner close to the points of the teeth that short portions of the material may not be dragged forward without disintegration. This object is attained by the coöperation of the upwardly-projecting edge of the supporting-plate with a series of dogs mounted upon a shaft above the plate and constructed with their sides in close proximity, so that their lower sides extend over the entire length of the plate, and thus press upon the whole surface of the material as it is fed to the drum. Where an adjustable plate is fitted to the under edge of the table adjacent to the drum, the forcing of the plate upwardly to compensate for wear brings its surface above the surface of the table and forms a "dam," which compels the juice expressed from the material to accumulate upon the table; and one object of the invention is to prevent the escape of the juice which may be discharged from the material during the disintegrating process, and this object is attained partly by inclining the feeding-table downwardly toward the cutting-drum, so that the juice may flow into the disintegrated material, and partly by means of a packing inserted between the adjustable plate and the forward edge of the table to prevent the juice flowing backwardly along such plate.

The invention also in cases where an apron-carrier is employed for delivering the material to the feeding-table of the machine provides means for partially closing the space between the carrier and the edge of the table and for clearing such space in case it becomes clogged. To prevent the whole drum from being disabled, I connect the teeth with the cutter-bars in such manner that they may be broken from the bar if obstructed by accident without injury to the bar; and this object is effected by forming the bars of cast metal and the teeth with shanks embedded in the bars in the operation of casting, such shanks having a strength less than that of the bar, so as to be broken without fracturing the bar in case any hard object is encountered by the teeth.

These improvements will be understood by reference to the annexed drawings, in which—

Figure 1 is a cross-section of the machine near the middle of its length. Fig. 2 is a side elevation of one of the dogs, and Fig. 3 a section of the same on line 3 3 in Fig. 2. Fig. 4 is a front elevation of the machine. Figs. 5 and 6 show a portion of the shell of the drum in end view and side view, respectively, illustrating the arrangement of the cutter-bars in the undercut grooves. Fig. 7 is a side view of one cutter-bar, and Fig. 8 a section of the same at the side of one of the teeth. Fig. 9 is a plan of the machine with only a portion of the feed-shaft illustrated and none of the feeding star-wheels, and Fig. 10 is an elevation of the table viewed from the rear edge. Figs. 9 and 10 are supplied to illustrate the flanges $d^2$, which support the feeding-table upon the frame of the machine, such flanges not being shown in the preceding figures.

$a$ designates the frame of the machine supporting the drum-shaft $b$, by which the drum-shell $c$ is rotated. A removable cover $s$ is shown above the drum, and a feeding-table $d$ is supported upon the bed at one side of the drum. The table is held removably on ledges $s'$ and has flanges $d^2$ bolted upon the same seats upon the frame, as shown in Fig. 9. Over the table a feed-shaft $e$ is supported and provided with star-wheels $f$, as is common. Adjacent to the flanges $d^2$ side plates $d^3$ are extended upward from the table to retain the cane thereon in the path of the star-wheels.

The drum is shown with numerous longitudinal dovetail grooves $g$, the undercut edges of which serve to hold in place the bars $h$, which carry the teeth $t$. The bars are shown in Figs. 7 and 8 as formed of cast-iron, with the teeth $t$ having shanks $u$ embedded in the bars by casting the bars around such shanks. Each of the bars is cast in a chill, which forms smooth dovetail edges upon the bar and secures a uniformity in the size of the bars, which enables them to fit detachably and interchangeably in the uniform grooves $g$ upon the drum. Each bar is formed with a dowel-hole $i$ near one end to receive a split pin or cotter $l$. (Shown in Fig. 5.) The hole $i$ in each bar is provided at the outer end with a recess or counterbore $j$ to receive the head of the cotter, and each groove in the drum is provided near one end with a hole $k$, through which the cotter is inserted and the ends of the same bent upon the inner side of the shell to hold the cotter in place. The teeth upon the cutter-bars are spaced uniformly apart, and the hole $i$ is shown upon each at a uniform distance from the end tooth of the bar, and the holes $k$ in the grooves $g$ are arranged at graduated distances from the ends of the drum, so as to project the teeth from different circles upon the periphery of the drum. The spaces between the teeth are shown in Fig. 7 three or four times as wide as the teeth themselves, which enables each tooth to cut the material freely and without clogging, and the disposition of the bars in the grooves in groups of four, as shown in Fig. 6, enables the teeth upon the bars to successively operate upon the entire surface of the cane as they successively intersect the entire edge of the feeding-table.

As the teeth upon the bottoms of the star-wheels move forwardly in feeding, their points tend to lift the cane upon the side nearest the drum, and in order to strip the cane from the teeth dogs $m$ are shown mounted upon the hubs of the star-wheels intermediate to the teeth of said wheels and projected (through an opening in the cover $s$) as closely as possible to the cutting-teeth $t$. The dogs are thickened at their forward ends $n$, as shown in Fig. 3, so as to contact with one another and form a continuous presser over the cane between the teeth $f$ of the feed-wheels and the teeth $t$ of the drum. Where the dogs are mounted upon the hubs of the star-wheels, as shown in the drawings, they could be pressed upwardly by the cane by turning upon the said hubs; but such movement of the dogs is resisted by their weight, and to prevent the cane from lifting the dogs when the weight proves insufficient a stop $n'$ is provided to limit their upward movement, and such stop may be formed by the upper edge of the aperture in the cover $s$, through which the dogs are projected into the casing, or by a strip secured along such edge, as shown in Fig. 1. To prevent the short ends of the cane as they are fed forward from being dragged from the feed-table $d$, the forward edge of the table is provided with an upwardly-projecting plate $p$, which is set at an angle and made adjustable, so as to hold it in close contact with the teeth. The sharp edge of the plate cuts into the under side of the cane and prevents it from being dragged forwardly.

The forward edge of the feeding-table $d$ is beveled upon its under side, and the adjustable plate $p$ is shown in Fig. 1 held between such beveled surface and a seat $a'$ upon the bed $a$ and its front corner projected above the surface of the table in opposition to the corners of the dogs. The corner of the plate is acute where it projects above the table, as the beveled edge of the table lies at an angle with the path of the rotating teeth.

Screws $o$ serve to adjust the plate $p$ as close as is practicable to the points of the teeth $t$, and such adjustment can be renewed whenever the edge of the plate or the points of the teeth are worn. The cane or other material is thus supported close to the path of the teeth, and the pressure of the teeth is directed toward the edge of the plate and operates to cut the material rather than to drag it forward. As the table $d$ is held from vertical movement by the flanges $d^2$, the plate $p$ and its packing are held firmly in place upon the seat $a'$ and are movable only as they are adjusted by the screws $o$. The edge of the plate $p$ where it projects above the front corner of the table unavoidably prevents the cane-juice from flowing freely from the table into the disintegrated material, where it could be utilized, and operates to retain a certain amount of the juice upon the table. To prevent the loss of this juice by leakage between the plate $p$ and the table, a packing $y$ is applied to the upper surface of the plate $p$.

The end of an apron carrier $q$ is diagrammatically shown in Fig. 1, arranged to deliver the cane or other material to the rear edge of the table $d$. Such edge is shown formed with an upwardly-curved portion $d'$, so that the slats of the carrier may move tangentially thereto. The surface of such a carrier is more or less uneven and cannot be operated to form a close joint with the edge of the table, and to prevent the material from being carried downwardly into the uneven space between the carrier and table I provide a movable block or stop $u$ to partially close such space. Such stop is shown in Fig. 4 hinged at each end upon a pivoted arm, and a handle $v$ is attached to one of the arms and secured by a latch $w$ to hold the stop in its operative position. By releasing the latch the handle can be moved rearwardly to drop the stop from the edge of the table, thus fully opening the space to clear it at any time that it may become clogged. The latch $w$ serves to hold the stop normally in its operative position.

With the machine thus organized the cane can be transferred from the carrier to the table without any clogging at the junction of the two, and the cane is fed to the cutter-teeth in such manner that it is wholly reduced and no portion of any material length can be discharged from the feeding apparatus without disintegration. The disintegrated material is thrown downward inside the bed with all the juice expressed from the cane reabsorbed in its fiber and is removed by a conveyer or other suitable means. The teeth, as shown in Fig. 8, are preferably secured in the bars each by a narrow shank $u$, which is so proportioned as to break or pull out of the bar without fracturing the bar, and the operation of the machine is therefore not deranged by the mere destruction of the teeth.

The drawings show the dogs $n$ journaled upon the shaft $e$; but any other support for the rear ends of the dogs would suffice, as the essential feature of the construction is the thickening of the free ends of the dogs, so that in practice they form a continuous presser beyond their thinner parts which form the stripper for the feeding-teeth $f$.

What I claim, and desire to secure by Letters Patent, is—

1. In a disintegrating-machine, the combination, with the cutter-drum having teeth projected therefrom, of the feeding-table $d$, the shaft $e$ over said table with feed-wheels $f$ thereon, and dogs $m$ operating as strippers for the teeth of the feed-wheels and thickened at their forward ends to form a continuous presser on the surface of the cane, and the drum having the cover $s$ with opening into which the thickened edges of the dogs extend close to the path of the cutter-teeth.

2. In a disintegrating-machine, the combination, with the cutter-drum having teeth projected therefrom, of a feeding-table, the shaft $e$ over said table with feed-wheels $f$ thereon, and dogs $m$ journaled upon the said shaft between the teeth of the feed-wheels, and operating as strippers for said teeth, the dogs being projected beyond the ends of the feeding-teeth and thickened to contact with one another to form a continuous presser on the surface of the cane, and the drum having the cover $s$ with opening into which the thickened edges of the dogs extend close to the path of the cutter-teeth.

3. In a disintegrating-machine, the combination, with the cutter-drum having teeth projected therefrom, of the stationary feeding-table $d$ inclined toward the drum and having its outer edge elevated and its inner edge provided on the under side with an inclined adjustable plate to compensate for wear, whereby the juice expressed from the cane is prevented from escape and is mingled with the disintegrated material, substantially as herein set forth.

4. In a disintegrating-machine, the combination, with the cutter-drum having teeth projected therefrom, of the feeding-table $d$ inclined toward the drum and having its forward edge beveled upon its under side, and the plate $p$ fitted to such bevel and supported adjustably to sustain the material adjacent to the cutters, with a longitudinal packing between the plate and the under side of the table to prevent the escape of the juice discharged from the material backwardly along such plate.

5. In a disintegrating-machine, the combination, with a cutter-drum having teeth projected therefrom, of a feeding-table adjacent to the edge of the drum, and having its outer edge curved upwardly as set forth, a carrier for delivering the material to the outer edge of the table, a movable stop to close the space between the carrier and such edge of the table, and means for supporting the stop when in operation and for withdrawing it to clear such space when it becomes clogged.

6. In a disintegrating-machine, the combination, with a cutter-drum having teeth projected therefrom, of a feeding-table adjacent to the edge of the drum with a shaft supported above the table and a series of star feed-wheels attached to such shaft, a series of weighted dogs journaled loosely to the shaft between the said wheels and extended to the forward edge of the table, and a stop above the forward ends of the dogs to limit their upward movement, the whole arranged and operated as and for the purpose set forth.

In testimony whereof I have hereunto set my hand in the presence of two subscribing witnesses.

JOHN W. HYATT.

Witnesses:
LEAVITT MERSEREAU.
THOMAS S. CRANE.